United States Patent [19]
Parsons

[11] Patent Number: 6,119,828
[45] Date of Patent: Sep. 19, 2000

[54] WET DISC BRAKE

[75] Inventor: Francis Edward Parsons, Geelong West, Australia

[73] Assignee: Brake Technologies Pty. Ltd., Victoria, Australia

[21] Appl. No.: 08/793,492

[22] PCT Filed: Aug. 24, 1995

[86] PCT No.: PCT/AU95/00529

§ 371 Date: Jul. 2, 1997

§ 102(e) Date: Jul. 2, 1997

[87] PCT Pub. No.: WO96/07034

PCT Pub. Date: Mar. 7, 1996

[30] Foreign Application Priority Data

Aug. 26, 1994 [AU] Australia ............................. PM7720

[51] Int. Cl.$^7$ ................................................ F16D 69/00
[52] U.S. Cl. ................................ 188/250 E; 188/250 G; 188/71.6
[58] Field of Search ................... 188/71.6, 71.4, 188/73.1, 73.2, 73.36, 73.37, 367, 261, 250 B, 250 E, 250 G, 264 R, 264 B, 264 D, 264 E, 264 F, 264 CC, 382, 218 XL, 264 A, 264 AA

[56] References Cited

U.S. PATENT DOCUMENTS

| 3,405,786 | 10/1968 | Goode | 188/264 E |
| 3,623,577 | 11/1971 | Scharlack | 188/71.6 |
| 4,236,612 | 12/1980 | Bayliss | 188/242 |
| 4,501,347 | 2/1985 | Cerny et al. | 188/250 G |
| 5,564,533 | 10/1996 | Parsons | 188/250 E |
| 5,816,901 | 10/1998 | Sirany | 451/415 |

FOREIGN PATENT DOCUMENTS

| 14317/55 | 6/1956 | Australia. | |
| 17988/56 | 11/1956 | Australia. | |
| 128758 | 12/1984 | European Pat. Off.. | |
| 307079 | 3/1989 | European Pat. Off. | 188/264 |
| 486 772 A1 | 5/1992 | European Pat. Off. | F16D 69/00 |
| 486772 | 5/1992 | European Pat. Off.. | |
| 626 525 A1 | 11/1994 | European Pat. Off. | F16D 69/00 |
| 1 527 763 | 10/1966 | France | 188/250 G |
| 1 425 202 | 9/1961 | Germany | 188/250 E |
| 2539557 | 3/1977 | Germany. | |
| 8-277866 | 10/1996 | Japan | F16D 69/00 |
| 1059706 | 2/1967 | United Kingdom. | |
| 93/07402 | 4/1993 | WIPO | 188/250 E |

Primary Examiner—Robert J. Oberleitner
Assistant Examiner—Mariano Sy
Attorney, Agent, or Firm—Banner & Witcoff, Ltd.

[57] ABSTRACT

A brake pad includes a friction material with a braking surface to contact a rotor disc. The braking surface has a leading edge relative to rotation of the rotor disc, an opposed trailing edge, and inner and outer circumferentially extending edges joining the leading and trailing edges. A plurality of grooves are formed in the friction material and open onto the braking surface. The grooves are angled from a leading end of the grooves rearwardly relative to a radial line and are curved from their leading end to their trailing end, and form substantially the arc of a circle when viewed in a direction perpendicular to the braking surface.

14 Claims, 6 Drawing Sheets

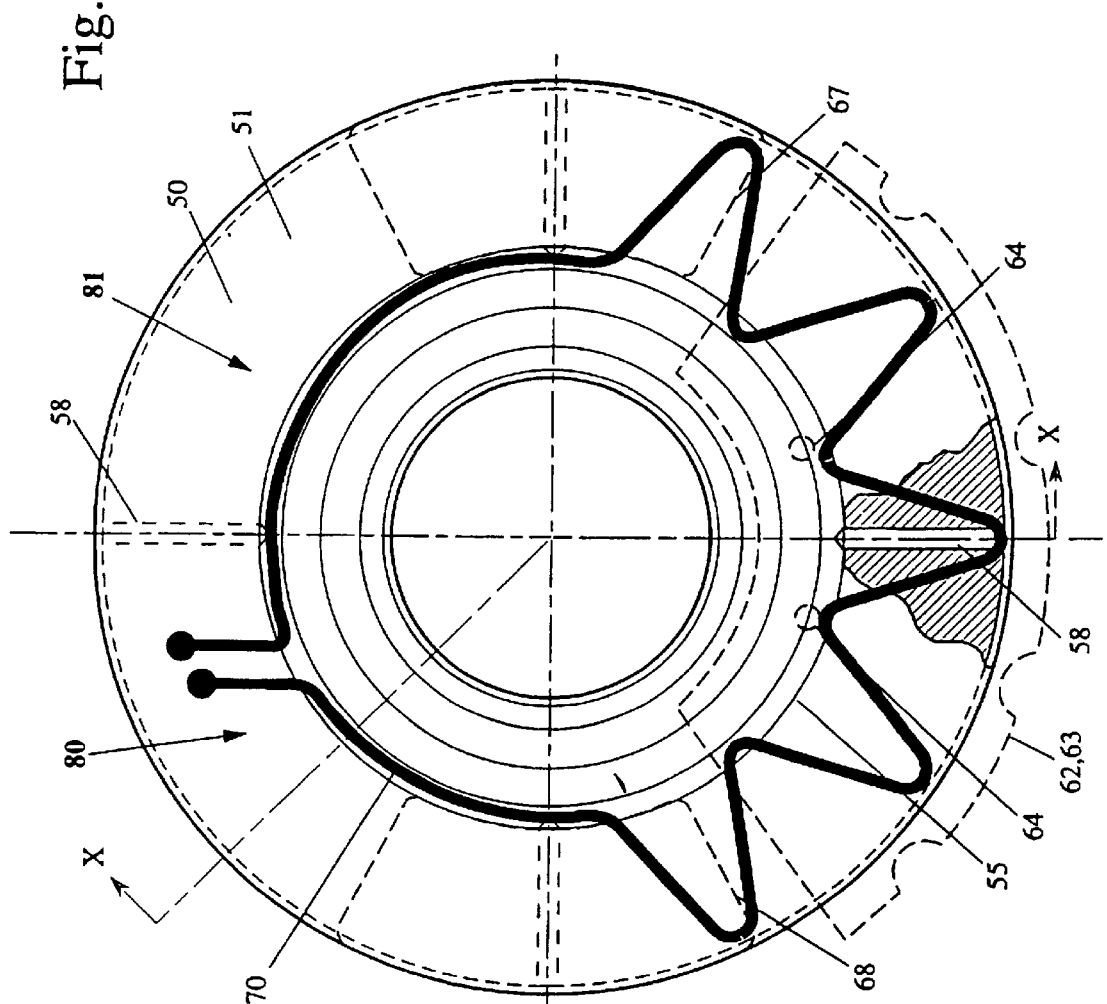
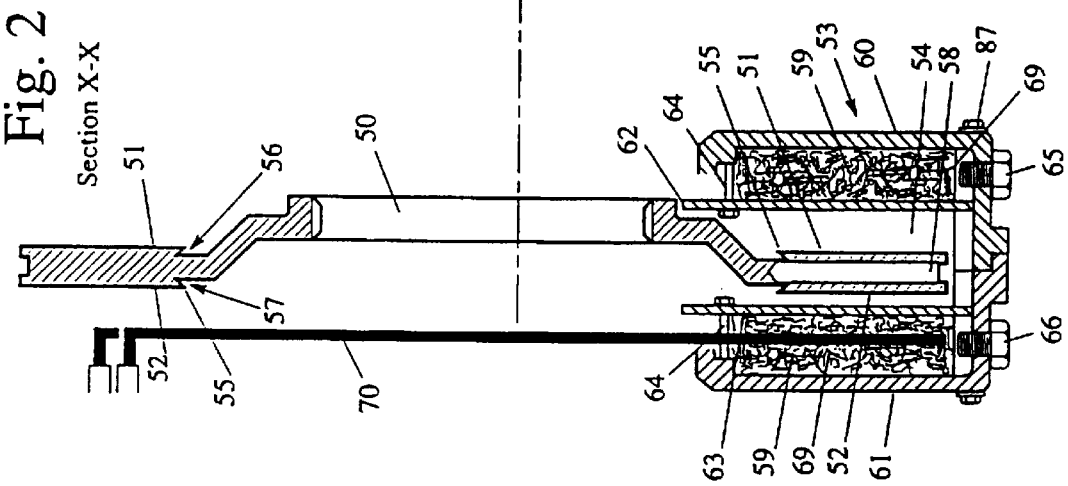

Section A-A

Section B-B

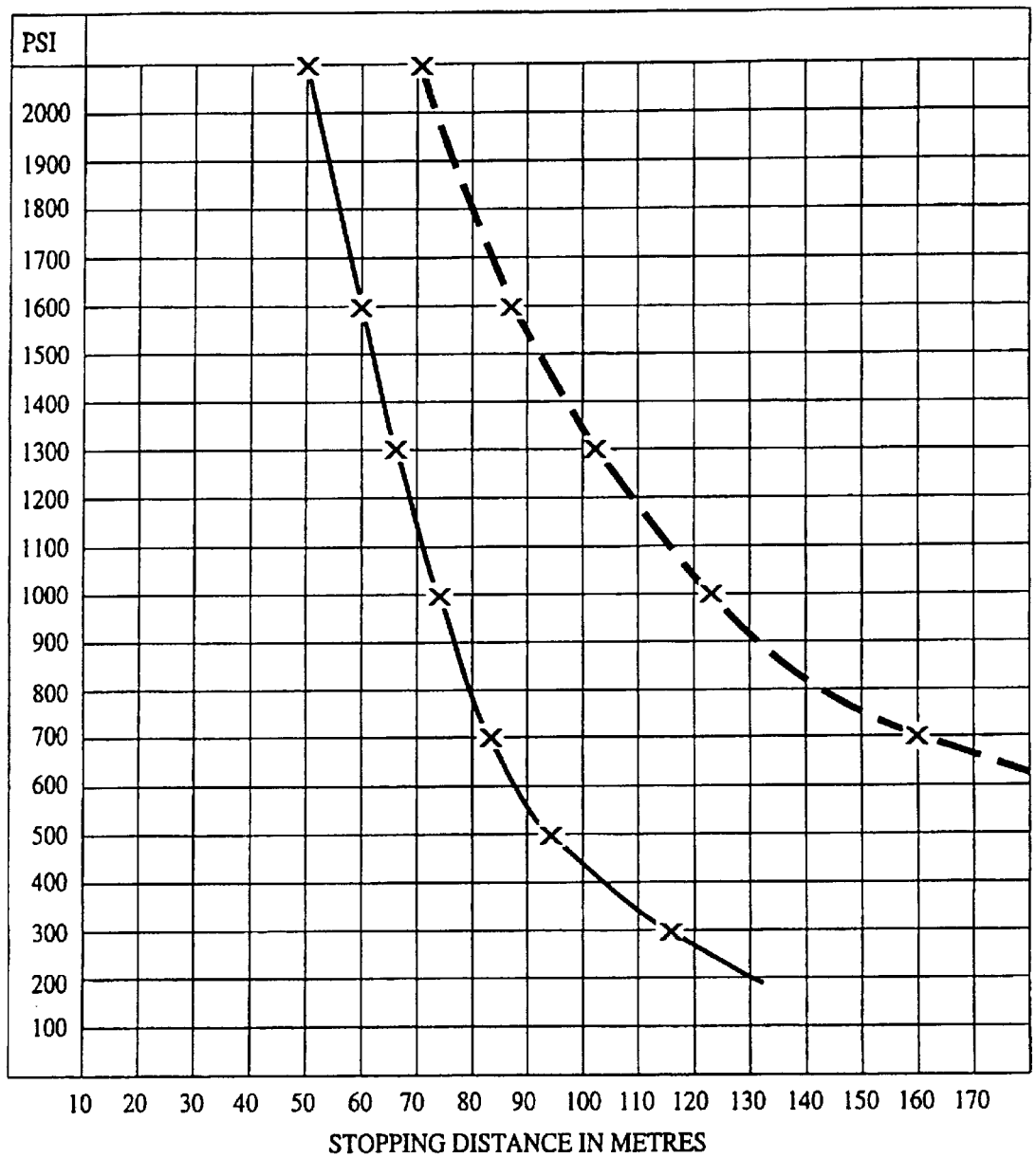
Fig.11
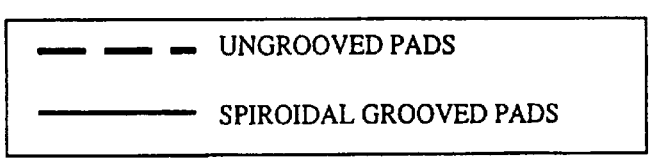

WET DISC BRAKE

The present invention relates to improvements in disc brake assemblies and components, particularly discs and friction pad configurations.

Conventional vehicle brakes most commonly comprise a rotor disc with a pair of friction material pads respectively acting on opposed braking surfaces of the rotor disc in a dry environment. Such systems have a number of significant disadvantages in that both the disc and particularly the friction material pads wear during use allowing wear particles to be released into the atmosphere which is polluting and may well be a health risk. Moreover the performance of such brakes is not uniform and varies considerably over time, particularly, as a result of friction pad wear and external factors such as whether water or other liquids get onto the braking surfaces during use.

Forms of wet disc brake are also known where a plurality of friction material discs are provided within a sealed brake housing containing oil. Such wet disc brakes have usually utilised oils of 7–8 or higher centistokes $mm^2/sec$ at 100° C. viscosity. Such oils normally also had a low viscosity index of 100 which caused substantial viscosity alterations as the oil temperature changed. The discs are provided such that some carrying grooved friction material rotate and other plain discs are stationary and braking effect is achieved by axially forcing the discs together. The oil is provided primarily as a coolant and for this purpose oil circulates through the grooves in the rotating discs. Oil of 7–8 (or higher) centistokes was, however, considered necessary to promote hydrodynamic lubrication and resistance to pressure "squeeze out" in the interengaged friction zone to suppress stick slip, wear, and localised overheating of the brake friction discs and plates. The drawback of utilising hydrodynamic lubrication regime is that a lower friction coefficient results in the interengaged region. Thus, because these oils cause an adverse effect on friction levels, it is necessary to have the much greater braking surface area provided by the plurality of discs. Moreover the configuration of these systems are generally considerably different to those of the dry friction systems described in the preceding paragraph making it difficult to interchange the respective assemblies.

In an earlier filed International Patent Application No. PCT/AU92/00540, there is also disclosed a brake assembly for a vehicle of the type comprising a single rotor disc adapted to rotate with an axle end and a stationary housing enclosing the rotor disc with one or more seals acting to provide a substantially sealed but pressure equalised zone surrounding at least a brake effect region of said rotor disc. At least one pair of friction pads is provided adapted to be engaged against opposed braking faces of a peripheral zone of the rotor disc, and the housing is formed so that it can contain a liquid in at least part of the braking zone. In one part of its disclosure, the aforesaid International Application indicates the liquid may be maintained at a level above the seals so as to prevent ingress of contaminants Into the interior of the housing and particularly in the area of the braking surfaces and friction pads. The aforesaid International Patent Application further discloses friction pads including backing plates with friction material secured thereto, the friction material having rotor disc engaging faces with one or more grooves formed therein of particular configuration. The aforementioned brake arrangement will, however, benefit from a minimum of liquid or lubrication and the grooves are provided for the purpose of oil skimming and draining from the braking surfaces in contrast to other oil immersed brake systems where grooves are provided to assist with oil circulation.

The objective of the present invention is to provide improved friction material products, particularly brake pads and other components, capable of use in brake assemblies of the type shown in the aforesaid International Patent Application.

A further preferred objective is to provide an improved brake arrangement capable of advantageously using the aforesaid friction material products and other brake assembly components. It is also a preferred objective that the brake arrangement according to the present invention be such that it is relatively easily interchangeable with the dry friction disc brake assemblies now commonly in use.

With regard to the friction material products, it is recognised in the aforesaid International Patent Application that the friction material needs to be provided with skimming and drainage grooves to enable liquid removal from the braking surfaces, however, the general positioning of these grooves has been found to be important in relation to braking performance. Moreover, it has been found that optimum performance is generally a balance between the number and width of grooves relative to the remaining friction surface areas or lands between the grooves. That is, there must be sufficient land areas remaining to achieve desired braking characteristics. Used throughout this specification "leading" and "trailing" or similar have reference to the brake pad and the direction of rotation of the rotor disc.

According to a first aspect of the present invention, there is provided a brake pad including a friction material having a braking surface adapted, in use, to contact a rotor disc of a brake assembly, said braking surface having a leading edge relative to rotation of said rotor disc, an opposed trailing edge, and inner and outer circumferentially extending edges joining said leading and trailing edges, said friction material further including a plurality of grooves formed in said friction material with said grooves opening onto said braking surface and being angled from a leading end of the grooves rearwardly relative to a radial line, at least one of said grooves having a said leading end opening onto the leading edge of said braking surface and exiting from said friction material at either said trailing edge or said outer circumferential edge, said at least one of said grooves having a widened mouth portion at the leading edge of said braking surface and a zone of decreasing width inwardly from said leading edge of the braking surface. Conveniently, the leading edge is substantially radially disposed in use. The trailing edge may also be radially disposed in use for the sake of convenience In manufacture. Preferably, at least two said grooves are provided with a leading end opening onto the leading edge of the friction material. Conveniently, each said groove having a leading end opening onto the leading edge has a substantially uniform width from said zone of decreasing width to its exit from the friction material. Conveniently, a plurality of said grooves are provided spaced over the length of the brake pad from the leading edge to the trailing edge with said grooves being equally spaced. In one preferred arrangement, the leading ends of the grooves having leading ends located rearwardly of the leading edge of the brake pad, are located radially outwardly of the Inner peripheral edge of the friction material, each of these grooves having trailing ends opening either on the outer peripheral edge or the trailing edge of the brake pad friction material. In a second preferred arrangement, the leading ends of the grooves having leading ends located rearwardly of the leading edge of the friction material of the brake pad are located opening onto the inner peripheral edge of the friction material. Conveniently, each of the grooves are substantially parallel to one another and are curved when viewed perpendicular to the braking surface, the curvature being such as to present a convex side of the grooves towards the leading edge of the friction material.

The advantage that is achieved by arranging one or more grooves leading from a leading edge of the pad friction material and exiting from preferably the outer peripheral edge is that an improved flow of liquid away from the braking surface region is achieved and thereby Improved braking performance particularly at low clamp pressures. Generally, it is believed the amount of oil on a rotating disc will increase as the radial distance increases from the axis of rotation. Thus, with the leading edge substantially radially disposed, the area with greatest liquid levels (i.e. further away from the axis of rotation) has the shortest groove and liquid will thus flow more quickly so that any increased volume of liquid is balanced by a shorter exit duct or groove. If the grooves do not open onto the inner peripheral edge their wear debris may be centrifugally deposited at this edge and cause scoring of the rotor disc braking surfaces. Allowing liquid to flow through this edge tends to eliminate rotor scoring and improve the useable life of the brake assembly as well as making braking more predictable.

In accordance with a further aspect of the present invention, there is provided a brake pad including a friction material having a braking surface adapted, in use, to contact a rotor disc of a brake assembly, said braking surface having a leading edge relative to rotation of said rotor disc, an opposed trailing edge, and inner and outer circumferentially extending edges joining said leading and trailing edges, said friction material further including a plurality of grooves formed in said friction material with said grooves opening onto said braking surface and being angled from a leading end of the grooves rearwardly relative to a radial line, at least one of said grooves opening onto the leading edge of said braking surface and said grooves further being curved from their leading end to their trailing end with a convex side of said grooves facing towards the leading edge of the braking surface, said grooves further forming substantially an arc of a circle when viewed in a direction perpendicular to the braking surface. Conveniently, lines tangential to the groove at the inlet end and at the outlet end form substantially equal angles with the inner and outer circumferential edges. Preferably, the grooves are substantially parallel. Preferably the aforesaid substantially equal angles have an angle between 30° and 40°. Conveniently, the angle is about 35°. Preferably, the grooves all have their inlet ends on a leading edge or the inner peripheral edge of the friction material and have their outlet ends on either the outer peripheral edge or a trailing edge of the friction material.

In accordance with a particularly preferred embodiment, the brake pad has a plurality of primary grooves formed as aforesaid with one or more secondary grooves intersecting the primary grooves at an acute angle thereto. Conveniently, the secondary grooves have inlet ends opening onto the leading edge of the friction material. Conveniently, friction material between the inlet end of a primary groove and a secondary groove at the leading edge is at least partially removed to provide a mouth region of decreasing width as it approaches a first intersection point between the primary and secondary grooves. Conveniently, the aforesaid first intersection point has a throat width greater than that which would be formed by intersection between the primary and secondary grooves.

Preferably the aforesaid primary grooves have a width between 1.5 and 4 mm, preferably 2 mm. Conveniently, the area of friction material land left after forming the grooves is between 60 and 80% of the braking surface area without grooves. Preferably the land area is about 75% of the braking surface area without grooves. Conveniently, the land width between primary grooves is about 5 to 6 mm which ensures sufficient mechanical strength.

In accordance with a further aspect of the present invention, a brake arrangement for a vehicle is provided adapted to be connected to an axle end, said arrangement comprising a single rotor disc adapted, in use, to rotate with said axle end and a stationary housing enclosing said rotor disc with one or more seals to provide a substantially self contained zone surrounding at least a braking effect region of said rotor disc, at least one friction pad located adjacent a braking surface of said rotor disc in said braking effect region so as to operationally engage said braking surface during a vehicle braking operation and liquid filling means provided to permit at least part of said substantially self contained zone to be filled with a liquid medium, said brake arrangement being characterised in that said braking surface is radially disposed and annular in shape having an inner circumferential edge and an outer circumferential edge, the inner circumferential edge defining a circumferentially extending liquid collection region adapted to collect liquid moving outwardly on surfaces of said rotor disc inwardly of inner circumferential edge and at least one outwardly directed passage leading from said liquid collection region to an outer periphery of said rotor disc.

Conveniently said liquid collection region is located axially inwardly of an overhang lip forming the inner circumferential edge of the braking surface. Preferably a plurality of said passages are provided leading radially outwardly through the body of said rotor disc. Conveniently, opposed radially directed annular braking surfaces are provided on either side of the rotor disc.

In accordance with a still further aspect of the present invention, a brake arrangement is provided for a vehicle adapted to be connected to an axle end, said arrangement comprising a single rotor disc adapted, in use, to rotate with said axle end and a stationary housing enclosing said rotor disc with one or more seals to provide a substantially self contained zone surrounding at least a braking effect region of said rotor disc, at least one friction pad located adjacent a braking surface of said rotor disc In said braking effect region so as to operationally engage said braking surface during a vehicle braking operation and liquid filling means provided to permit at least part of said substantially self contained zone to be filled with a liquid medium, said brake arrangements being characterised by heat exchange means to alter the temperature of said liquid medium within said housing to maintain said temperature within a predetermined range.

In accordance with a still further aspect, the present invention provides a rotor disc for use in a vehicle brake assembly which in use contains liquid through which said rotor disc passes, said rotor disc being characterised by at least one radially disposed annular braking surface having a radially inner circumferential edge and a radially outer circumferential edge, the inner circumferential edge defining a circumferentially extending liquid collection region adapted to collect liquid moving outwardly on surfaces of said rotor disc inwardly of inner circumferential edge and at least one outwardly directed passage leading from said liquid collection region to an outer periphery of said rotor disc.

By the brake arrangements described above, it is possible to achieve a minimisation of liquid on the braking surfaces adjacent the friction pad or pads when a braking operation is required to be carried out.

In accordance with a still further aspect of the present invention, a brake arrangement for a vehicle is provided adapted to be connected to an axle end, said arrangement comprising a single rotor disc adapted, in use, to rotate with said axle end and a stationary housing enclosing said rotor disc with one or more seals to provide a substantially sealed zone within at least part of said stationary housing such that at least a braking effect region of said rotor disc, in use, passes through said substantially sealed zone, at least one friction pad located adjacent a braking surface of said rotor disc in said braking effect region so as to operationally engage said braking surface during a vehicle braking operation and liquid filling means provided to permit at least part of said substantially sealed zone to be filled with a liquid medium, said brake arrangement being characterised by filter means to remove friction material particles from said liquid at least in the vicinity of where the or each said friction pad engages said braking surface or surfaces. Conveniently, said filter means may comprise compartment means located in a lower region of the stationary housing configured to entrap and retain said friction material particles. By the arrangement described above, the liquid in the vicinity of the friction pads is maintained clean and unlikely to contaminate the disc rotor surface with films of smeared wear debris thereby ensuring uniform braking performance.

In accordance with yet another aspect, the present invention provides a brake arrangement for a vehicle adapted for connection to an axle end, said arrangement comprising a single rotor disc adapted, in use, to rotate with said axle end and a stationary housing enclosing said rotor disc with one or more seals providing a substantially sealed zone within at least part of said stationary housing such that at least a braking effect region of said rotor disc, in use, passes through said substantially sealed zone, at least one friction pad located adjacent a braking surface of said rotor disc in said braking effect region so as to operationally engage said braking surface during a vehicle braking operation, and said stationary housing containing a liquid medium within at least said substantially sealed zone, said brake arrangement being characterised in that said liquid medium has a viscosity of less than 7 centistokes mm$^2$/sec at 100° C. Preferably said liquid medium has a viscosity in the range of 2 to 5 centistokes mm$^2$/sec at 100° C. Preferably said liquid medium has a viscosity index of between 135 to 145, preferably about 140 whereby changes in its viscosity with temperature changes is minimised. The advantages of utilising low viscosity oils and preferably low viscosity synthetic mineral oils as the liquid medium is that hydrodynamic lubrication effects are suppressed in favour of a mixed lubrication regime. Mixed lubrication regimes provide much higher friction levels than hydrodynamic lubrication resulting in improved performance of the brake. The brake assembly enables the pads to act partly in oil stripping mode and partly in oil shear mode thereby combining thick film and ultrathin film conditions. A much higher friction pad to disc engagement pressures, friction pad oil skimming, grooving and ultra low lubricant viscosities are combined to result in mixed film lubrication which sees hydrodynamic lubrication suppressed in favour of higher friction micro elastohydrodynamic and boundary lubrication regimes.

Several embodiments of the present invention will now be described with reference to the accompanying drawings in which:

FIG. 1 is a plan view of a preferred form of a rotor disc capable of use in a brake arrangement according to the present invention;

FIG. 2 is a cross-sectional view of FIG. 1 taken alone line X—X and also showing one possible preferred form of filter means;

FIG. 11 is a graph showing stopping distance against applied friction pad pressure for a vehicle travelling at 100 km/h comparing grooved liquid immersed pads according to the present invention with ungrooved pads in an otherwise similar configuration.

Figure 1A:
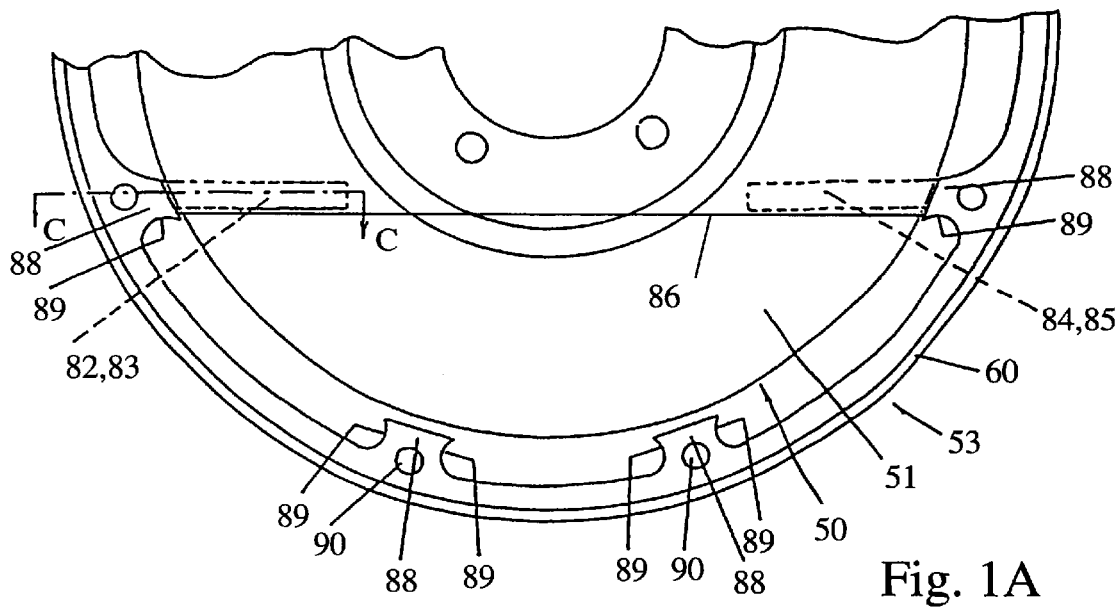
FIG. 1A is a partial view of a brake assembly housing section illustrating preferred features of the present invention.

Referring now to FIGS. 1 and 2, a rotor disc 50 is illustrated adapted to be secured to a vehicle axle end by any suitable means. The rotor disc has radial annular and opposed braking surfaces 51, 52. A stationary housing 53 (only partially shown in FIG. 2) defines a substantially sealed braking effect zone 54 surrounding the braking surfaces 51, 52, the zone being created by seals not shown. The housing 531 in use, contains a liquid such as a low viscosity oil. In PCT/AU92/00540 it is suggested that the oil volume should be relatively high but it has now been found that this is not necessary and preferably all that is required is sufficient liquid to keep the seals wet in use, i.e. by splashing or the like. Conveniently about one quarter of the vertical height of the brake assembly has been found to be satisfactory. The positioning of the brake pads adapted to engage the opposed braking surfaces 51, 52 may be as shown at 67, 68 (approximately half way up the height of the brake assembly) or may alternatively be located in the upper quarter zones 80, 81 (FIG. 1).

As shown in FIGS. 1 and 2, the inner radial edges 55 of the braking surfaces 51, 52 is preferably undercut to form circumferential liquid collection zones 56, 57 to collect centrifugally directed liquid on surfaces inwardly of the edges 55. This collected liquid can then flow through radial passages 58 to minimise the amount of liquid on the surfaces 51, 52.

It is generally desirable to minimise the amount of liquid at the interface between the braking surfaces of the rotor disc and the braking surface of the friction pad. The foregoing is relevant in this regard. Other factors include using a low viscosity oil as the liquid within the housing as maintaining low viscosity enables a low coefficient of friction between the braking members when braking force is not applied but permits a high coefficient of friction when force is applied to the pads during braking. While oils of a viscosity up to ISO 15 at 40° C. may be used, it is more preferred to use oils in the range of ISO 3 to ISO 7 which provide improved performance. More particularly, synthetic mineral oils having viscosities less than 7 (preferably 2 to 5) centistokes mm$^2$/sec at 100° C. are preferred. A disadvantage of utilising ultra low viscosity oils such as 2 centistokes in the past has been that conventional oils of ultra low viscosity had high volatilities and low flash points. This problem has now been overcome by the so-called synthetic mineral oil based oils such as the Shell Oil Company trademarked Extra High Viscosity Index Oils i.e. XHVII and XHVIII oils. These oils provide flash points and volatilities such that they can be utilised for their ultra low viscosity in the present braking system without flash points or volatility problems.

It is well recognised that oil viscosity increases as temperature decreases and decreases as temperature increases. To overcome problems that may arise with operation at severe temperatures, (either hot or cold) it is proposed, as shown in FIGS. 1 and 2 to incorporate a heat exchanger 70 within the oil in the brake housing. The heat exchanger 70 may be formed by a metallic tube (such as stainless steel) adapted to convey engine cooling water (normally at about 50° C.) therethrough to heat the oil in the housing when necessary. Suitable valving and temperature sensors may be provided to supply this heating capability only when necessary to maintain temperatures of the oil in the brake assembly within an acceptable range. If the brake assembly is to be utilized in particularly hot environments, it may also be necessary to convey a cooling fluid through the heat exchanger 70. This fluid might be cooled by any suitable means including facilities such as air conditioning equipment that might be already on board the vehicle or by some purpose built device. If desired the heat exchanger 70 might be formed by passages cast into the brake assembly housing.

Because the brake assembly is sealed, wear debris from the pads and the rotor disc is retained within the housing. This debris contained in the oil may cause wear debris/oil smear films on the rotor disc braking surfaces and can cause poor braking characteristics. Thus, it is desirable to remove this wear debris from at least the region of the mating surfaces of the pads and rotor disc. Low viscosity oils also tend to enable settling out of this wear debris more easily and quickly than higher viscosity oils.

The pad wear debris can be effectively separated to acceptable levels by integral gravity settling and integral centrifuging techniques. Thus the housing 53 may include one or several "settling chambers" 59 in the sump of the brake housing. The settling chambers 59 may be cast into either the inner or the outer housing parts 60, 61 or may be formed by a wall member 62, 63 bolted at 64 to the housing parts. The bottom edge of the wall members 62, 63 may be sealed if desired to the bottom wall surface of the respective housing part by provision of a machined or cast recess. Magnetic plugs 65, 66 might be used to attract metallic particles into the settling chambers 59 and upon removal enables the wear debris to be removed from these settling chambers without discarding the bulk of the oil. If the settling chamber or chambers is/are provided with a positive flow oil current by choosing its location to coincide with the pad oil discharge grooves, the respective chamber will always remain full and during periods of brake disc rotation, a slow but continuous flow of oil through the settling chambers will occur. When the disc is at rest or rotating, a substantial portion of the sump oil will be captured in the settling chamber for variable periods depending upon brake usage patterns.

In the case of "slow flow" through the settling chamber or chambers 59, larger and heavier particles are collected. During periods such as overnight or other idle times when the rotor is stationary, the gravitational settling of pad wear debris continues particularly for the finer particles which may otherwise stay in suspension. To further promote retention of wear debris, the chambers 59 may include one or more spaced pads 69 of a material such as steel wool. Where the brake does not experience regular idle periods following brake use an integral or external pump can be used to circulate the oil containing wear debris through an external filter. Such an arrangement can also include components to either cool or heat the scavenged oil at the same time as the purification process.

Figure 1B:
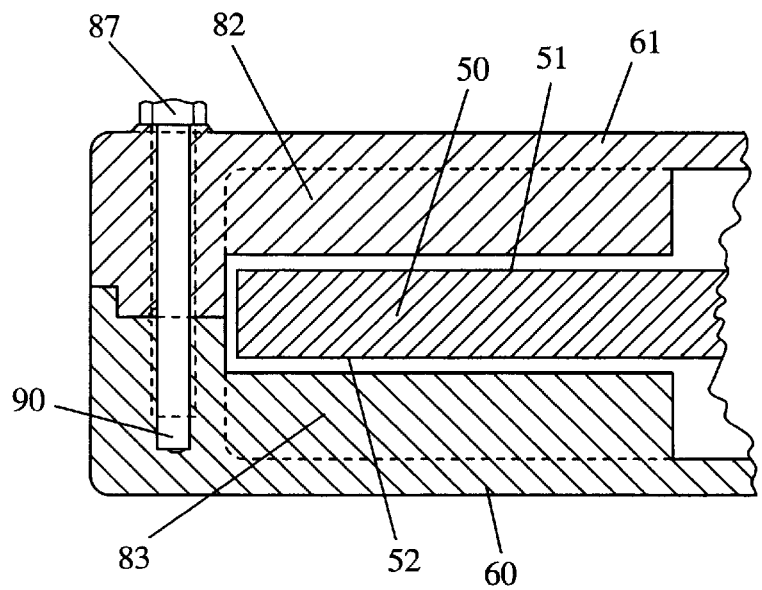
FIG. 1B is a section view taken along line C—C of FIG. 1A.

Referring now to FIGS. 1A and 1B, a lower section of the brake housing 53 is illustrated. A pair of baffles 82, 83 and 84,85 are provided on either side of the housing 53 just above the liquid medium surface level 86. Each baffle 82, 83, 84, 85 is located so as to provide minimal spacing between the baffles and the rotor braking surfaces 51, 52 so as to minimise bulk splashing of the liquid medium or forcing of the liquid medium into upper zones of the housing 53 by action of the rotor 50 during use. Further, each of the bolt receiving bosses 88 having bores 90 adapted to receive the bolts 87 to hold the housing parts 60, 61 together, are formed with at least one curved surface 89 adapted to promote turbulent conditions in the liquid medium when the brake assembly is in use.

Figure 3:
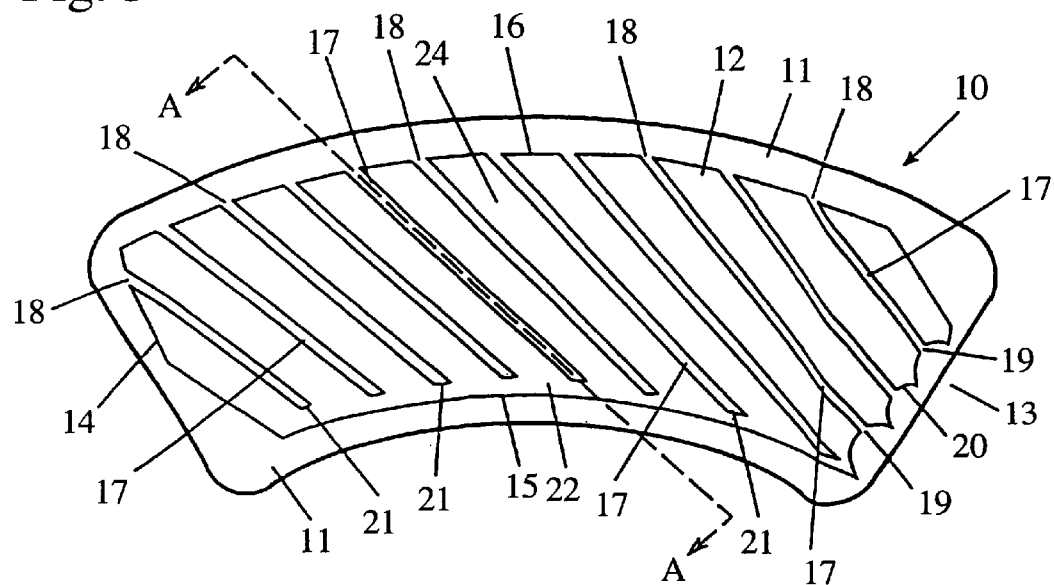
FIG. 3 is a plan view of a brake pad configuration of a first preferred embodiment.
Figure 5:
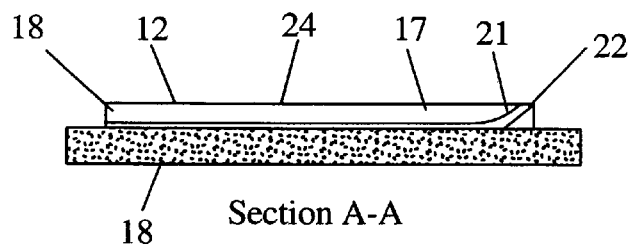
FIG. 5 is a section view along lines A—A of FIGS. 3 or 4.
Figure 4:
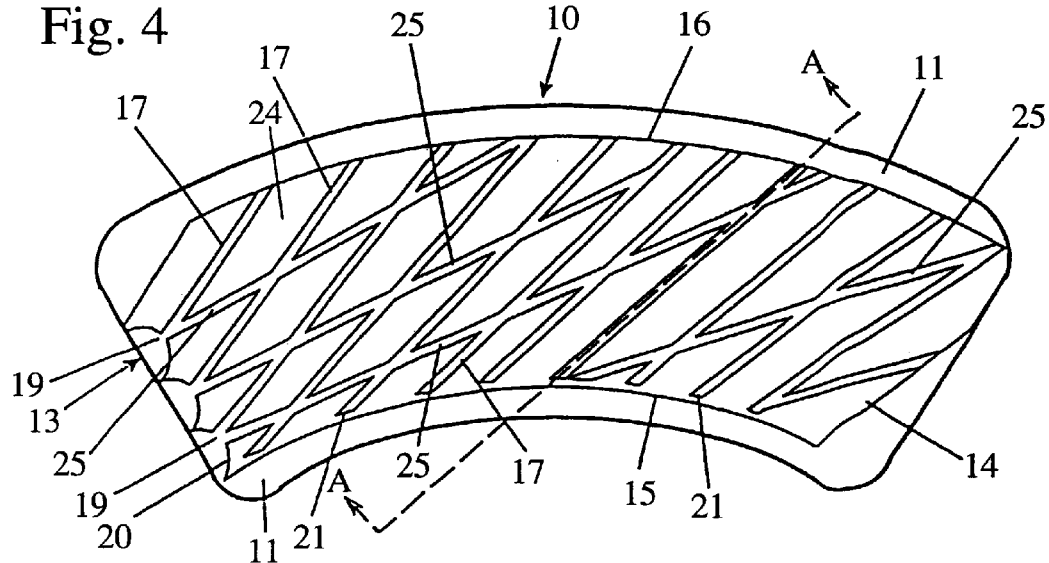
FIG. 4 is a plan view similar to FIG. 3 showing a second preferred embodiment.

Several preferred embodiments of friction pad arrangements will now be described with reference to FIGS. 3 to 10. The positioning of these pads in the brake arrangement shown in FIGS. 1 and 2 may be, for example, at 67 and 68 and these may be operated by any known conventional actuating system. Referring first to FIG. 3, the brake pad 10 comprises a backing plate 11 of conventional configuration and a friction material 12 secured thereto. The friction material 12 has a leading edge 13, a trailing edge 14, an inner peripheral edge 15 and an outer peripheral edge 16. A plurality of primary grooves 17 are formed into the friction material with outlet ends 18 opening onto the outer peripheral edge 16 or the trailing edge 14. A number of the primary grooves 17 have inlet ends 19 opening directly onto the leading edge 13 and each of these inlet ends 19 have mouth regions 20 of decreasing width adapted to funnel liquid flow into the grooves 17. This arrangement provides an effective means of collecting and removing bulk liquid from interengaging brake surfaces during a braking operation. The grooves 17 rearwardly of the above discussed group of grooves have inlet ends 21 located outwardly of the inner peripheral edge 15 so that a sealing land 22 of friction material is formed as discussed in preceding parts of this specification. Each of the grooves 17 have a width of 1.5 to 4 mm and an intervening land 24 width of about 5 to 6 mm. Conveniently, each of the grooves are straight and parallel to each other. FIG. 4 illustrates a modification to the configuration shown in FIG. 3 in that secondary grooves 25 are provided each forming an acute angle with the primary grooves 17. Conveniently at least some of the secondary grooves 25 have their inlet ends coincident with an inlet end of the primary grooves 17 at the leading edge 13. If desired the throat area of this intersection point might be enlarged to improve the liquid flow pattern.

Figure 6:
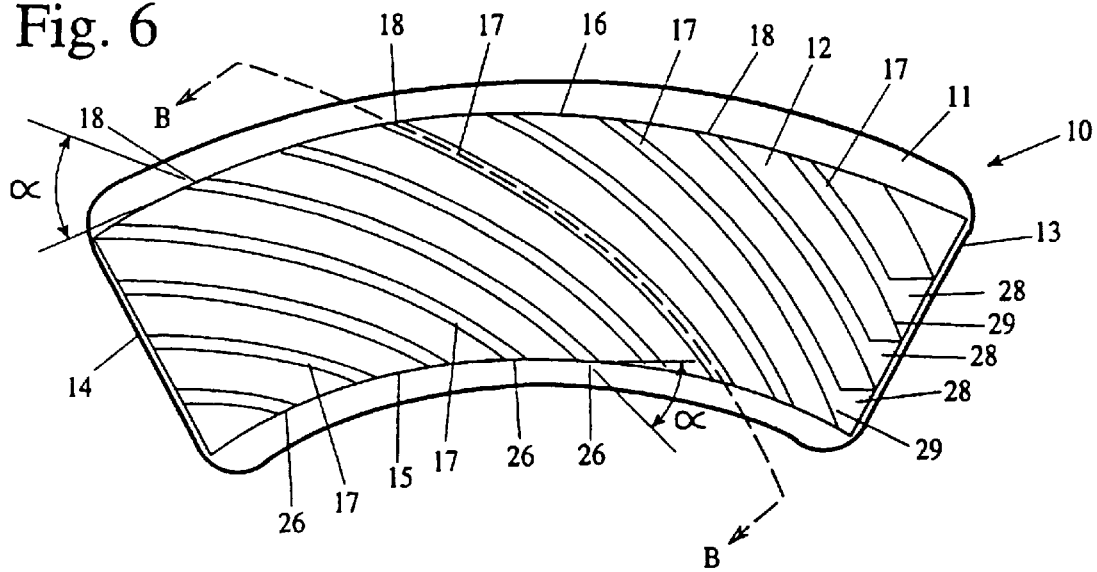
FIG. 6 is a plan view similar to earlier figures showing a third preferred embodiment of a brake pad.

Reference will now be made to the embodiments of FIGS. 6 to 10. In FIG. 6, the primary grooves 17 are similarly disposed to the embodiment of FIG. 3 except that the grooves are curved from their inlet ends to the outlet ends and that each groove 17 has an inlet end opening onto an edge of the friction material 12. Conveniently, the curvature of each of the grooves approximates an arc of a circle and for each of the grooves, the radius of curvature is substantially equal. Conveniently, each of the grooves 17 are parallel to one another. Further, it is desired that the angle a at the inlet 26 to each of the grooves 17 opening onto the inner peripheral edge 15, being the angle between the tangent to the groove curve and the tangent to the curve of the edge 15 at the inlet 26, is substantially equal for all such grooves. Moreover, this angle is also substantially equal to the same angle at the outlet ends of the grooves opening onto the outer peripheral edge 16. Conveniently, this angle may be between 20° and 40° but is preferably about 30° which is desired for optimum performance for a conventional vehicle wheel travelling initially at the allowed road speed limit i.e. 100–110 km/h. This corresponds to a rotor disc rpm of about 800–1000.

Figure 7:
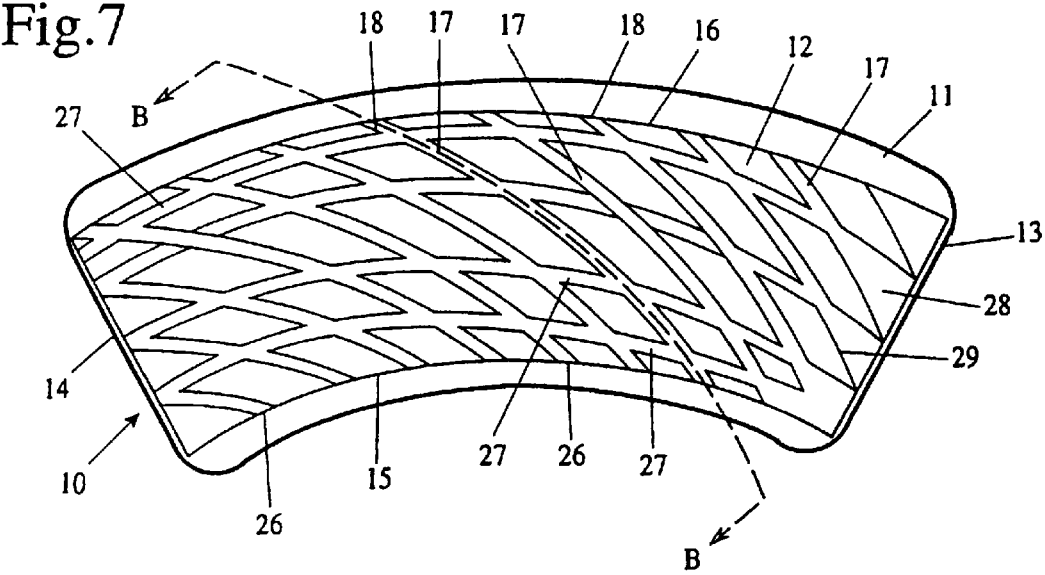
FIG. 7 is a plan view similar to earlier figures showing a fourth preferred embodiment of a brake pad.
Figure 8:
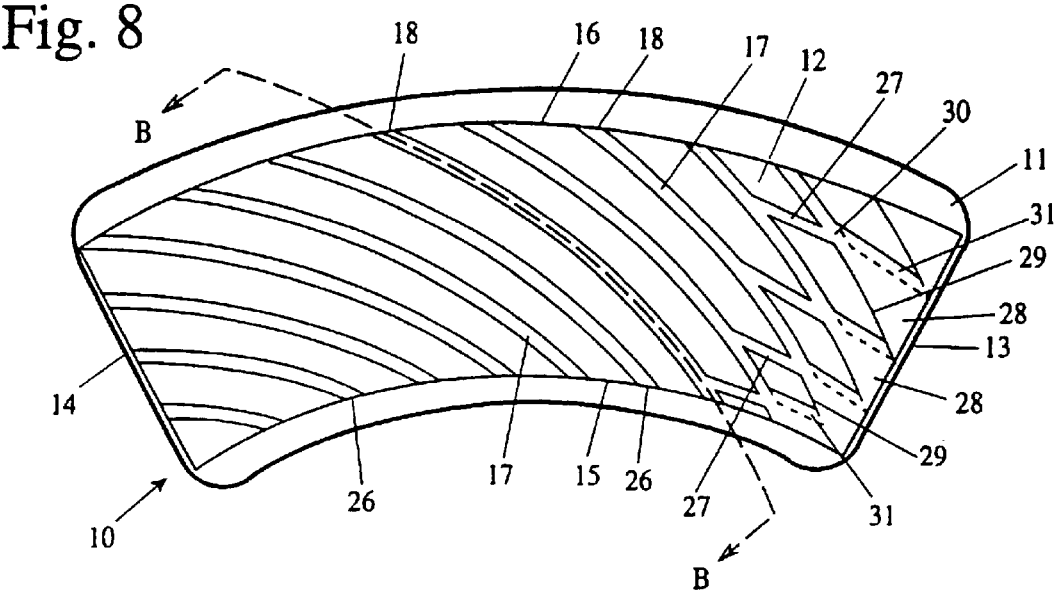
FIG. 8 is a plan view similar to FIG. 7 showing a possible further modification.

FIGS. 7 and 8 show embodiments Including secondary grooves 27 each intersecting the primary grooves 17 at an acute angle. The secondary grooves 27 may be curved as illustrated or they may be straight as indicated in FIG. 4. Further, the secondary grooves 27 may pass through substantially all the friction material as shown in FIG. 7 or they may be terminated at their intersection with an intermediate primary groove 17 as shown in FIG. 8.

Conveniently, in each case, the primary grooves opening onto the leading edge 13 of the friction material have mouth regions 28 of wider proportions which conveniently funnel liquid flow into the adjacent grooves 17. Preferably the radially inner wall of the groove 17 forms one wall 29 of the widened mouth region. As illustrated in FIG. 8, the throat 30 of the intersection between the grooves 17 and 27 at the mouth region may be widened, for example by removal of the friction material indicated in dotted outline 31, so as to improve liquid flow into the two grooves 17 and 27 extending from this throat.

Figure 9:
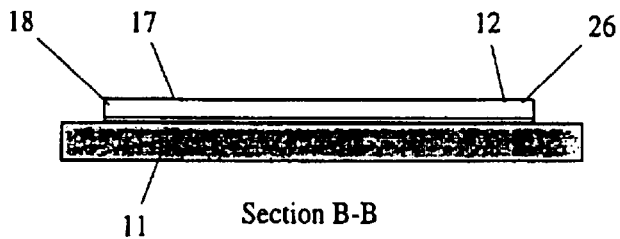
FIG. 9 is a plan view similar to FIG. 8 showing a possible further modification.
Figure 10:
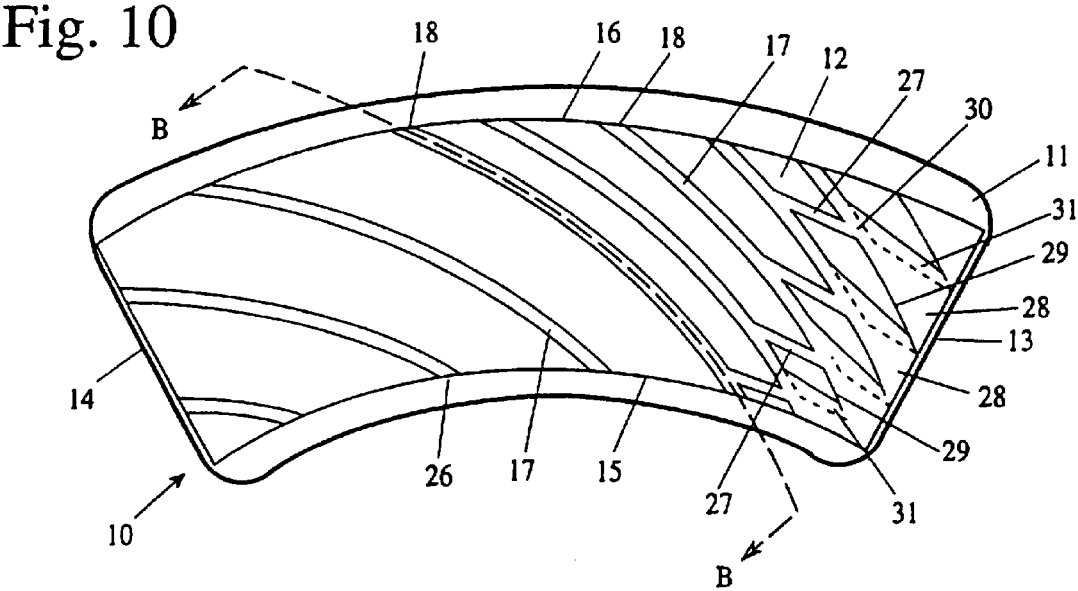
FIG. 10 is a section view along line B—B of FIGS. 8 or 10.

FIG. 9 shows a cross sectional view along lines B—B of FIGS. 8 and 10. FIG. 10 shows an embodiment similar to FIG. 9 except that the grooves 17 are more widely spaced towards a trailing end of the load.

FIG. 11 is a graph showing a vehicle stopping distance against brake pressure for a 2.5 tonne Toyota Land Cruiser utilising wet disc brakes as described in the foregoing specification and comparing ungrooved pads with brake pads produced according to a configuration as shown in FIG. 8 hereof. It will be apparent from this comparison, that the brake system and particularly the brake pads according to the present invention out perform ungrooved pads in an otherwise similar configuration.

What is claimed is:

1. A brake pad including a friction material having a braking surface adapted, in use, to contact a rotor disc of a brake assembly, said braking surface having a leading edge relative to rotation of said rotor disc, an opposed trailing edge, and inner and outer circumferentially extending edges joining said leading and trailing edges, said friction material further including a plurality of grooves formed in said friction material with said grooves opening onto said braking surface and being angled from a leading end of the grooves rearwardly relative to a radial line, at least one of said grooves having a said leading end opening onto the leading edge of said braking surface and exiting from said friction material at either said trailing edge or said outer circumferential edge, said at least one of said grooves having a widened mouth portion at the leading edge of said braking surface and a zone of decreasing width inwardly from said leading edge of the braking surface, wherein some of said grooves have leading ends spaced inwardly from said inner circumferential edge of said braking surface.

2. A brake pad including a friction material having a braking surface adapted, in use, to contact a rotor disc of a brake assembly, said braking surface having a leading edge relative to rotation of said rotor disc, an opposed trailing edge, and inner and outer circumferentially extending edges joining said leading and trailing edges, said friction material further including a plurality of grooves formed in said friction material with said grooves opening onto said braking surface and being angled from a leading end of the grooves rearwardly relative to a radial line, at least one of said grooves having a said leading end opening onto the leading edge of said braking surface and exiting from said friction material at either said trailing edge or said outer circumferential edge, said at least one of said grooves having a widened mouth portion at the leading edge of said braking surface and a zone of decreasing width inwardly from said leading edge of the braking surface, wherein some of said grooves have leading ends opening onto said inner circumferential edge of said braking surface.

3. A brake pad including a friction material having a braking surface adapted, in use, to contact a rotor disc of a brake assembly, said braking surface having a leading edge relative to rotation of said rotor disc, an opposed trailing edge, and inner and outer circumferentially extending edges joining said leading and trailing edges, said friction material further including a plurality of grooves formed in said friction material with said grooves opening onto said braking surface and being angled from a leading end of the grooves rearwardly relative to a radial line, at least one of said grooves opening onto the leading edge of said braking surface and said grooves further being curved from their leading end to their trailing end with a convex side of said grooves facing towards the leading edge of the braking surface, said grooves further forming substantially an arc of a circle when viewed in a direction perpendicular to the braking surface.

4. A brake pad according to claim 3, wherein at least some of said grooves have a leading end opening onto the inner circumferential edge of the braking surface and a trailing end opening onto the outer circumferential edge of the braking surface and are configured whereby lines tangential to the groove at the leading end and the trailing end form equal angles with the inner and outer circumferential edges of the braking surface.

5. A brake pad according to claim 3 or claim 4, wherein said grooves are substantially parallel to one another.

6. A brake pad according to claim 4, wherein said equal angles are between 30° and 40°.

7. A brake pad according to claim 3, wherein each said groove has a width of between 1.5 and 4 mm.

8. A brake pad according to claim 3, wherein the grooves occupy between 20% and 40% of the braking surface area without said grooves.

9. A brake pad according to claim 3, wherein a braking surface width between adjacent said grooves is between 5 and 6 mm.

10. A brake pad according to claim 3, wherein at least one of said grooves has a widened mouth portion at the leading edge of said braking surface and a zone of decreasing width inwardly from said leading edge of the braking surface.

11. A brake pad according to claim 10 or claim 6, wherein some of said grooves have leading ends spaced inwardly from said inner circumferential edge of said braking surface.

12. A brake pad according to claim 10, wherein a plurality of said grooves have leading ends opening onto the leading edge of said braking surface, each of said grooves having a said widened mouth portion at the leading edge and a said zone of decreasing width inwardly from said leading edge of the braking surface.

13. A brake pad including a friction material having a braking surface adapted, in use, to contact a rotor disc of a brake assembly, said braking surface having a leading edge relative to rotation of said rotor disc, an opposed trailing edge, and inner and outer circumferentially extending edges joining said leading and trailing edges, said friction material further including a plurality of grooves formed in said friction material with said grooves opening onto said braking surface and being angled from a leading end of the grooves rearwardly relative to a radial line, at least one of said grooves having a said leading end opening onto the leading edge of said braking surface and exiting from said friction material at either said trailing edge or said outer circumferential edge, said at least one of said grooves having a widened mouth portion at the leading edge of said braking surface and a zone of decreasing width inwardly from said leading edge of the braking surface, wherein a plurality of said grooves have leading ends opening onto the leading edge of said braking surface, each of said grooves having a said widened mouth portion at the leading edge and a said zone of decreasing width inwardly from said leading edge of the braking surface, and some of said grooves have leading ends spaced inwardly from said inner circumferential edge of said braking surface.

14. A brake pad including a friction material having a braking surface adapted, in use, to contact a rotor disc of a brake assembly, said braking surface having a leading edge relative to rotation of said rotor disc, an opposed trailing edge, and inner and outer circumferentially extending edges joining said leading and trailing edges, said friction material further including a plurality of grooves formed in said friction material with said grooves opening onto said braking surface and being angled from a leading end of the grooves rearwardly relative to a radial line, at least one of said grooves having a said leading end opening onto the leading edge of said braking surface and exiting from said friction material at either said trailing edge or said outer circumferential edge, said at least one of said grooves having a widened mouth portion at the leading edge of said braking surface and a zone of decreasing width inwardly from said leading edge of the braking surface, wherein a plurality of said grooves have leading ends opening onto the leading edge of said braking surface, each of said grooves having a said widened mouth portion at the leading edge and a said zone of decreasing width inwardly from said leading edge of the braking surface, and some of said grooves have leading ends opening onto said inner circumferential edge of said braking surface.

* * * * *